(12) United States Patent
Perego et al.

(10) Patent No.: US 10,755,832 B2
(45) Date of Patent: Aug. 25, 2020

(54) MEDIUM- OR HIGH-VOLTAGE ELECTRIC CABLE

(71) Applicant: NEXANS, Courbevoie (FR)

(72) Inventors: Gabriele Perego, Milan (IT); Christelle Mazel, Ruy (FR); Matthias Meyer, Luebeck (DE); Dimitri Charrier, Ecully (FR); Xavier Festaz, Villieu-Loyes-Mollon (FR)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 16/061,895

(22) PCT Filed: Dec. 15, 2016

(86) PCT No.: PCT/FR2016/053481
§ 371 (c)(1),
(2) Date: Jun. 13, 2018

(87) PCT Pub. No.: WO2017/103512
PCT Pub. Date: Jun. 22, 2017

(65) Prior Publication Data
US 2018/0374602 A1    Dec. 27, 2018

(30) Foreign Application Priority Data
Dec. 18, 2015  (FR) ..................... 15 62775

(51) Int. Cl.
*H01B 9/02*   (2006.01)
*H01B 3/44*   (2006.01)
(Continued)

(52) U.S. Cl.
CPC ............. *H01B 3/441* (2013.01); *C08L 23/06* (2013.01); *C08L 23/12* (2013.01); *C08L 23/14* (2013.01);
(Continued)

(58) Field of Classification Search
CPC ..................................... H01B 9/027
(Continued)

(56) References Cited

U.S. PATENT DOCUMENTS 6,124,770 A     9/2000 Sakamoto et al.
6,861,143 B2 *  3/2005 Castellani .............. H01B 3/441
                                              174/102 SC
(Continued)

FOREIGN PATENT DOCUMENTS

CN     103102592        5/2013
CN     103222012 A      7/2013
(Continued)

OTHER PUBLICATIONS

Yijian Lin et al: "Comparison of olefin copolymers as compatibilizers for polypropylene and high-density polyethylene", Journal of Applied Polymer Science, vol. 113, No. 3, Aug. 5, 2009 (Aug. 5, 2009), pp. 1945-1952.
(Continued)

*Primary Examiner* — Chau N Nguyen
(74) *Attorney, Agent, or Firm* — Sofer & Haroun, LLP

(57) ABSTRACT

A medium-voltage or high-voltage power cable includes an elongated electrical conductor element, a first semiconducting layer, an electrically insulating layer, and a second semiconducting layer. The electrically insulating layer is at least one layer of a thermoplastic polymer material having a continuous polypropylene matrix in which a polyethylene is dispersed. A process for the preparation of such a cable is also provided.

12 Claims, 1 Drawing Sheet

(51) Int. Cl.
*C08L 23/14* (2006.01)
*C08L 23/06* (2006.01)
*C08L 23/12* (2006.01)
*H01B 3/46* (2006.01)
*H01B 3/30* (2006.01)

(52) U.S. Cl.
CPC .......... *H01B 3/46* (2013.01); *C08L 2203/202* (2013.01); *C08L 2205/035* (2013.01); *C08L 2207/02* (2013.01); *H01B 3/303* (2013.01)

(58) Field of Classification Search
USPC ........................ 174/102 SC, 120 SC, 110 PM
See application file for complete search history.

(56) References Cited

U.S. PATENT DOCUMENTS

| | | | | |
|---|---|---|---|---|
| 7,459,635 | B2* | 12/2008 | Belli | H01B 7/189 |
| | | | | 174/110 R |
| 9,411,116 | B2* | 8/2016 | Weimann | G02B 6/4436 |
| 2012/0301718 | A1* | 11/2012 | Nishiura | B32B 15/08 |
| | | | | 428/380 |
| 2013/0161059 | A1* | 6/2013 | Steffl | C08F 255/02 |
| | | | | 174/105 SC |

| | | | |
|---|---|---|---|
| 2013/0233604 | A1 | 9/2013 | Perego |
| 2014/0006468 | A1 | 3/2014 | Weimann |
| 2014/0190723 | A1 | 7/2014 | Vestberg |

FOREIGN PATENT DOCUMENTS

| | | |
|---|---|---|
| CN | 104448543 | 3/2015 |
| FR | 2111059 | 6/1972 |
| JP | 2003 160705 | 6/2003 |
| WO | 2010/023236 | 3/2010 |

OTHER PUBLICATIONS

Zhou Yao et al: "Evaluation of polypropylene/polyolefin elastomer blends for potential recyclable HVDC cable insulation applications" IEEE Transactions on Dielectrics and Electrical Insulation, IEEE Service Center, Piscataway, NJ, US, vol. 22, No. 2, Apr. 1, 2015 pp. 673-681.
International Search Report dated Mar. 27, 2017.
Korean Office Action dated Jul. 17, 2019.
Office Action dated Jul. 26, 2019.
Office Action dated Apr. 16, 2019.

* cited by examiner

MEDIUM- OR HIGH-VOLTAGE ELECTRIC CABLE

RELATED APPLICATIONS

This application is a National Phase Application of PCT/FR2016/053481 filed on Dec. 15, 2016, which in turn claims the benefit of French Patent Application No. 15 62775 filed on Dec. 18, 2015.

BACKGROUND

Field of the Invention

The present invention relates to an electric cable exhibiting an improved thermal conductivity.

It typically, but not exclusively, applies to electric cables intended for power transmission, in particular medium-voltage power cables (in particular from 6 to 45-60 kV-MV cables) or high-voltage power cables (in particular greater than 60 kV, and which can range up to 500-600 kV-HV cables), whether they are direct current or alternating current, in the fields of overhead, undersea or underground electricity transmission, or alternatively of aeronautics.

Description of Related Art

A medium- or high-voltage power transmission cable generally comprises, from the inside towards the outside:
  an elongated electrically conducting element, in particular made of copper or of aluminium;
  an internal semiconducting layer surrounding said elongated electrically conducting element;
  an electrically insulating layer surrounding said internal semiconducting layer;
  an external semiconducting layer surrounding said insulating layer; and
  optionally, an electrically insulating protective sheath surrounding said external semiconducting layer.

The electrically insulating layer is a layer made of a polymer material, generally based on crosslinked low density polyethylenes (LDPEs), i.e. XLPEs. The properties of XLPEs are well known in the field of electric cables, in particular owing to the fact that they are easy to use and that they exhibit good dielectric properties (insulating materials). They also have improved physicochemical properties in comparison with noncrosslinked LDPE; in particular, cables comprising insulating layers based on XLPE can be used up to temperatures of 90° C., whereas cables comprising an LDPE-based insulating layer can only be used at lower temperatures, not exceeding 70° C.

However, XLPEs exhibit a number of disadvantages. In particular, these polymers cannot be easily recycled. Furthermore, the crosslinking process limits the rate of manufacture of the cables comprising an XLPE-based insulating layer. This is because, in order to obtain a satisfactory degree of crosslinking, it is necessary for the polymer to be able to be brought to the temperature required in order to obtain the crosslinking thereof for a sufficiently long period of time. Thus, the rate of production of the cables comprising an XLPE-based insulating layer has to be adjusted so that the passage time in the crosslinking tunnel is long enough to obtain a satisfactory degree of crosslinking, which represents a not insignificant restrictive limit in terms of production capacity. Furthermore, the crosslinking reactions must under no circumstances take place during the extrusion of the polyethylene-based material so as to avoid any risk of formation of XLPE particles in the extruder (screw, collar, head of the extruder), which particles might subsequently migrate into the insulating layer or into the semiconducting layer of the cable and create defects therein. This is because the presence of XLPE particles affects the final properties of the cable in so far as these particles result in a lack of homogeneity, mainly of the material of the insulating layer or else at the interface between the insulating layer and the semiconducting layers. This phenomenon is known under the name of "scorch phenomena".

The use of LDPE-based materials for the insulating layers of cables is thus, in principle, an alternative to the use of XLPE-based materials. However, LDPE-based materials exhibit the disadvantage of not being able to be used at temperatures of greater than 70° C., which also has the consequence of reducing their ability to transmit power so as to avoid any overheating of the insulating layer at temperatures of greater than 70° C.

Furthermore, polypropylene-based materials exhibit good dielectric properties which are, for example, taken advantage of in transformers and in cables, in particular undersea cables comprising an insulating layer based on polypropylene laminated paper (PPLP cables).

On the other hand, in the field of MV and HV cables, the use of polypropylene as material of the insulating layer is not yet very widespread.

Polypropylene is generally characterized by a lower density than that of polyethylene, this lower density being associated with thermal conductivity properties which are slightly inferior to those of polyethylene.

However, the fact that the electrically insulating layer has a high thermal conductivity generally represents an advantage when the power cables are MV and HV cables in so far as this facilitates the discharge of the heat generated by the Joule effect, thus making it possible to increase the amount of power transmitted, this being a function of the maximum acceptable temperature of the conducting element.

United States Patent Application US 2014/0190723 describes an HV cable comprising a conducting element surrounded, in this order, by an internal semiconducting layer, an electrically insulating layer and an external semiconducting layer, and in which the electrically insulating layer is a polymer material based on a polypropylene comprising nanoscopic fragments of catalyst originating from a solid catalytic system used in the polymerization of propylene monomers. According to this same document, the insulating layer can additionally include other types of polymers, among which may in particular be mentioned high-density polyethylenes (HDPEs), in particular for which the density is greater than 0.945 g/cm$^3$, and also linear low-density polyethylenes (LLDPEs), in particular having a density varying between 0.909 and 0.930 g/cm$^3$. It is known that polypropylene and polyethylene are not compatible, since these two compounds are immiscible (see, for example, J. W. Teh, Journal of Applied Polymer Science, 1983, 28(2), 605-618). Their combination, within one and the same material, forms a composite and is thus in general not recommended since a reduction in the mechanical properties, in particular a reduction in the elongation at break, is then observed. Furthermore, the nonhomogeneities of such a material affect the dielectric properties of the insulating layers in MV and HV cables. In particular, these nonhomogeneities are the cause of the localized accelerated ageing of the material constituting the insulating layer and consequently of premature electrical defects of the cable comprising such an insulating layer.

There thus exists a need for an insulating material which can advantageously be used as electrically insulating layer in MV and HV cables, exhibiting both good dielectric properties and good mechanical properties, that is to say combining the advantages of the polyethylenes in terms of thermal conductivity and the advantages of the polypropylenes in terms of mechanical and thermal properties. In particular, the inventors of the present patent application set themselves the aim of providing for a medium-voltage or high-voltage power cable in which the material constituting the insulating layer can be recycled, obtained without scorch phenomenon at high extrusion rates and additionally exhibiting good thermal conductivity properties, in particular at temperatures of greater than 70° C. and ranging up to 90° C., indeed even 130° C., in the event of overloading.

This aim is achieved by the power cable which will be described below and which constitutes the first subject-matter of the invention.

OBJECTS AND SUMMARY

A first subject-matter of the present invention is thus a medium-voltage or high-voltage power cable comprising at least one elongated electrical conductor element, a first semiconducting layer which surrounds the elongated electrical conductor element, an electrically insulating layer which surrounds the first semiconducting layer, and a second semiconducting layer which surrounds said electrically insulating layer, said power cable being characterized in that the electrically insulating layer is at least one layer of a thermoplastic polymer material comprising a continuous polypropylene matrix obtained by polymerization of Ziegler-Natta type of at least one propylene homopolymer or copolymer, and in which an ethylene homo- or copolymer having a density varying from 0.930 to 0.970 g/cm$^3$ is dispersed.

According to the invention, "continuous" polypropylene matrix is understood to mean a polypropylene matrix forming a continuous block in which an ethylene homo- or copolymer is dispersed. In other words, the polypropylene matrix does not exhibit discontinuity; it is not in the form of several distinct disconnected elements.

According to the invention, "thermoplastic" polymer is understood to mean a non-crosslinkable and consequently non-crosslinked polymer.

In particular, the polymer material does not comprise crosslinking agents, silane-type coupling agents, photoinitiators, peroxides and/or additives which make possible crosslinking.

The polymer material is preferably recyclable.

According to the invention, polymerization of Ziegler-Natta type is understood to mean a coordination polymerization obtained in the presence of a Ziegler-Natta catalyst which can in particular be chosen from halides of transition metals, especially titanium, chromium, vanadium and zirconium, as a mixture with organic derivatives of metals other than transition metals, in particular an alkylaluminium.

The thermoplastic polymer material preferably does not comprise particles of catalyst(s), in particular in the form of micrometric or sub-micrometric fragments, on conclusion of the polymerization of Ziegler-Natta type.

Also according to the invention, when it is said that the ethylene homo- or copolymer is "dispersed" in the continuous polypropylene matrix, this means that said ethylene homo- or copolymer does not form an intimate and homogeneous mixture with the polypropylene phase but is, on the contrary, homogeneously dispersed therein in the form of fine particles. Typically, the size of the particles of ethylene homo- or copolymer is of the order of 1 µm to 2 µm. Consequently, the thermoplastic polymer material constituting the electrically insulating layer is a composite material.

According to a first alternative form, the propylene copolymer is a heterophasic copolymer comprising a thermoplastic phase of propylene type and an elastomer phase of the type of copolymer of ethylene and of an α-olefin.

The elastomer phase of the heterophasic copolymer can represent at least 20% by weight approximately and preferably at least 45% by weight approximately, with respect to the total weight of the heterophasic copolymer.

The α-olefin of the elastomer phase of the heterophasic copolymer can be propylene.

Mention may be made, as example of this type of copolymer, of the heterophasic copolymer sold by Basell Polyolefins under the reference Adflex® Q 200 F.

According to a second alternative form, the propylene copolymer is a random propylene copolymer.

Mention may be made, as examples of (random) propylene copolymers, of copolymers of propylene and of olefin, the olefin being chosen in particular from ethylene and an α-olefin other than propylene.

The α-olefin other than propylene can correspond to the formula $CH_2=CH-R^1$, in which $R^1$ is a linear or branched alkyl group having from 2 to 10 carbon atoms, chosen in particular from the following olefins: 1-butene, 1-pentene, 4-methyl-1-pentene, 1-hexene, 1-octene, 1-decene, 1-dodecene and one of their mixtures.

The α-olefin of the copolymer of propylene and of α-olefin preferably represents at most 15 mol % approximately and more preferably at most 10 mol % approximately of the copolymer.

Copolymers of propylene and of ethylene are preferred as propylene copolymer.

Among the polypropylenes which can be used according to the invention, preference is very particularly given to the random propylene copolymer sold by *Borealis* under the reference Bormed® RB 845 MO.

The propylene homopolymers which can be used according to the invention preferably have an elastic modulus ranging from 1250 to 1600 MPa approximately. The propylene copolymers which can be used according to the invention (in particular the propylene copolymers of the second alternative form) preferably have an elastic modulus ranging from 600 to 1200 MPa approximately.

The propylene homopolymer or copolymer (in particular the propylene copolymer of the second alternative form) can have a melting point of greater than 130° C. approximately, preferably of greater than 140° C. approximately, and more preferably ranging from 140° C. to 165° C. approximately.

The propylene homopolymer or copolymer (in particular the propylene copolymer of the second alternative form) can have an enthalpy of fusion ranging from 30 to 100 J/g approximately.

The propylene homopolymer or copolymer (in particular the propylene copolymer of the second alternative form) can have a melt flow index ranging from 0.5 to 3 g/10 min, measured at 230° C. approximately with a load of 2.16 kg approximately according to Standard ASTM D1238-00.

According to a preferred embodiment of the invention, the propylene homopolymer or copolymer (in particular the propylene copolymer of the second alternative form) represents from 40% to 70% by weight, with respect to the total weight of the thermoplastic polymer material.

As indicated above, the ethylene homo- and copolymers which can be used according to the invention have a density varying from 0.930 to 0.970 g/cm$^3$ and more preferably still from 0.940 to 0.965 g/cm$^3$. They belong to the category of the "high-density" polyethylenes or HDPEs according to Standard ISO 1183A (at a temperature of 23° C.). Thus, the density is measured according to Standard ISO 1183A (at a temperature of 23° C.).

The ethylene copolymer in accordance with the invention is preferably a nonpolar ethylene copolymer which can comprise a comonomer of α-olefin, in particular $C_3$-$C_{12}$ α-olefin, type. Preferably, the comonomer of α-olefin type can be chosen from propylene, 4-methyl-1-pentene, 1-butene, 1-hexene or 1-octene. It will be preferable to use, as α-olefin, 1-octene, in order to form the copolymer of ethylene and of octene (PEO), or 1-butene, in order to form a copolymer of ethylene and of butene.

Typically, the nonpolar ethylene copolymer is obtained from the copolymerization of ethylene with said α-olefin, in the presence of a Ziegler-Natta catalyst or by polymerization according to a low-pressure process.

According to a preferred embodiment of the invention, the polyethylene is an ethylene homopolymer. Mention may be made, as example of ethylene homopolymer which is particularly preferred according to the present invention, of the polyethylene sold under the trade name Eltex® A4009 MFN1325 by Ineos, the density of which is 0.960 g/cm$^3$ according to Standard ISO 1183A (at a temperature of 23° C.).

According to a preferred embodiment of the invention, the polyethylene which can be used according to the invention (chosen from an ethylene homo- or copolymer) represents from 10% to 50% by weight approximately, with respect to the total weight of the thermoplastic polymer material.

In addition to the polypropylene (i.e. the propylene homopolymer or copolymer, in particular that of the second alternative form) defined above and the high-density polyethylene, the thermoplastic polymer material can additionally include at least one α-olefin homopolymer or copolymer.

The α-olefin preferably corresponds to the formula $CH_2$=CH—$R^2$, in which $R^2$ is a linear or branched alkyl group having from 2 to 12 carbon atoms, chosen in particular from the following olefins: 1-butene, isobutylene, 1-pentene, 4-methyl-1-pentene, 1-hexene, 1-octene, 1-decene, 1-dodecene and one of their mixtures. Among such α-olefins, 1-hexene and 1-octene are preferred.

In addition to the polypropylene (i.e. the propylene homopolymer or copolymer, in particular that of the second alternative form) defined above and the high-density polyethylene, the thermoplastic polymer material can also additionally include a heterophasic copolymer comprising a thermoplastic phase of propylene type and an elastomer phase of the type of copolymer of ethylene and of an α-olefin, a polyethylene or one of their mixtures.

In particular, the combination of a propylene homopolymer or copolymer of the second alternative form, and of at least one heterophasic copolymer and/or of a polyethylene makes it possible to obtain a thermoplastic polymer material exhibiting good mechanical properties, in particular in terms of elastic modulus, and electrical properties.

The elastomer phase of the heterophasic copolymer can represent at least 20% by weight approximately, and preferably at least 45% by weight approximately, with respect to the total weight of the heterophasic copolymer.

The α-olefin of the elastomer phase of the heterophasic copolymer can be propylene.

The polyethylene can be a linear low-density polyethylene. In the present invention, the expression "low-density polyethylene" means a polyethylene having a density ranging from 0.91 to 0.925 approximately. This density is measured according to Standard ISO 1183A (at a temperature of 23° C.).

According to a preferred embodiment of the invention, the α-olefin homopolymer or copolymer and/or the heterophasic copolymer and/or the polyethylene represent, independently of one another, from 5% to 50% by weight approximately of the thermoplastic polymer material.

Mention may be made, as example of this type of polymer, of the heterophasic copolymer sold by Basell Polyolefins under the reference Adflex® Q 200 F.

The thermoplastic polymer material can additionally comprise one or more additives.

The additives are well known to a person skilled in the art and can be chosen from antioxidants, UV stabilizers, copper scavengers or water-treeing inhibitors.

The thermoplastic polymer material can typically comprise from 0.01% to 5% by weight approximately and preferably from 0.1% to 2% by weight approximately of additives, with respect to the total weight of the thermoplastic polymer material.

More particularly, the antioxidants make it possible to protect the polymer composition from the thermal stresses generated during the stages of manufacture of the cable or during operation of the cable.

The antioxidants are preferably chosen from hindered phenols, thioesters, sulfur-based antioxidants, phosphorus-based antioxidants, amine-type antioxidants and one of their mixtures.

Mention may be made, as examples of hindered phenols, of pentaerythritol tetrakis(3-(3,5-di(tert-butyl)-4-hydroxyphenyl)propionate) (Irganox® 1010), octadecyl 3-(3,5-di(tert-butyl)-4-hydroxyphenyl)propionate (Irganox® 1076), 1,3,5-trimethyl-2,4,6-tris(3,5-di(tert-butyl)-4-hydroxybenzyl)benzene (Irganox® 1330), 4,6-bis(octylthiomethyl)-o-cresol (Irgastab® KV10), 2,2'-thiobis(6-(tert-butyl)-4-methylphenol) (Irganox® 1081), 2,2'-thiodiethylene bis[3-(3,5-di(tert-butyl)-4-hydroxyphenyl)propionate] (Irganox® 1035), 2,2'-methylenebis(6-(tert-butyl)-4-methylphenol), 1,2-bis(3,5-di(tert-butyl)-4-hydroxyhydrocinnamoyl)hydrazine (Irganox® MD 1024) and 2,2'-oxamidobis(ethyl 3-(3,5-di(tert-butyl)-4-hydroxyphenyl)propionate).

Mention may be made, as examples of thioesters, of didodecyl 3,3'-thiodipropionate (Irganox® PS800), distearyl thiodipropionate (Irganox® PS802) and 4,6-bis(octylthiomethyl)-o-cresol (Irganox® 1520).

Mention may be made, as examples of sulfur-based antioxidants, of dioctadecyl 3,3'-thiodipropionate and didodecyl 3,3'-thiodipropionate.

Mention may be made, as examples of phosphorus-based antioxidants, of tris(2,4-di(tert-butyl)phenyl) phosphite (Irgafos® 168) and bis(2,4-di(tert-butyl)phenyl) pentaerythritol diphosphite (Ultranox® 626).

Mention may be made, as examples of amine-type antioxidants, of phenylenediamines (e.g., 1PPD or 6PPD), diphenylamine styrenes, diphenylamines, mercaptobenzimidazoles and polymerized 2,2,4-trimethyl-1,2-dihydroquinoline (TMQ).

Mention may be made, as examples of mixtures of antioxidants, of Irganox B 225, which comprises an equimolar mixture of Irgafos 168 and Irganox 1010 as are described above.

The thermoplastic polymer material can additionally comprise at least one dielectric liquid.

Mention may be made, as dielectric liquid, of mineral oils (e.g., naphthenic oils, paraffinic oils, aromatic oils or polyaromatic oils), vegetable oils (e.g., soybean oil, linseed oil, rapeseed oil, maize oil or castor oil) or synthetic oils, such as aromatic hydrocarbons (alkylbenzenes, alkylnaphthalenes, alkylbiphenyls, alkyldiarylethylenes, and the like), silicone oils, ether oxides, organic esters or aliphatic hydrocarbons.

According to a specific embodiment, the dielectric liquid represents from 1% to 20% by weight approximately, preferably from 2% to 15% by weight approximately and more preferably from 3% to 12% by weight approximately, with respect to the total weight of the thermoplastic polymer material.

According to the present invention, the electrically insulating layer of the cable in accordance with the invention is non-crosslinked and extruded.

The electrically insulating layer of the cable in accordance with the invention can be obtained by conventional extrusion processes well known to a person skilled in the art.

The electrically insulating layer exhibits a thickness which can vary as a function of the type of cable envisaged. In particular, when the cable in accordance with the invention is a medium-voltage cable, the thickness of the insulating layer is typically from 4 to 5 mm approximately and more particularly 4.5 mm approximately. When the cable in accordance with the invention is a high-voltage cable, the thickness of the insulating layer typically varies from 17 to 18 mm (for voltages of the order of 150 kV approximately) and can range up to thicknesses ranging from 20 to 25 mm approximately for voltages of greater than 150 kV (very-high-voltage cables).

In the present invention, "electrically insulating layer" is understood to mean a layer, the electrical conductivity of which can be at most $1 \times 10^{-9}$ S/m and preferably at most $1 \times 10^{-10}$ S/m (siemens per metre) (at 25° C.).

The elongated electrically conducting element can be a single-part conductor, such as, for example, a metal wire, or a multipart conductor, such as a plurality of metal wires which are or are not twisted.

The elongated electrically conducting element can be made of aluminium, of aluminium alloy, of copper, of copper alloy and of one of their combinations.

In the present invention, "semiconducting layer" is understood to mean a layer, the electrical conductivity of which can be at least $1 \times 10^{-9}$ S/m (siemens per metre), preferably at least $1 \times 10^{-3}$ S/m, and preferably can be less than $1 \times 10^{3}$ S/m (at 25° C.).

In a specific embodiment, the first semiconducting layer, the electrically insulating layer and the second semiconducting layer constitute a three-layer insulation. In other words, the electrically insulating layer is in direct physical contact with the first semiconducting layer, and the second semiconducting layer is in direct physical contact with the electrically insulating layer.

The first and the second semiconducting layers are preferably made of a thermoplastic polymer material.

The cable in accordance with the present invention can additionally comprise an electrically insulating sheath surrounding the second semiconducting layer, and which can be in direct physical contact with the latter.

The cable in accordance with the present invention can additionally comprise a metal shield surrounding the second semiconducting layer. In this case, the electrically insulating sheath surrounds said metal shield.

This metal shield can be a "wire" shield composed of an assembly of conductors made of copper or aluminium arranged around and along the second semiconducting layer, a "strip" shield composed of one or more conductive metal strips made of copper or aluminium optionally positioned helically around the second semiconducting layer or of a conductive metal strip made of aluminium positioned longitudinally around the second semiconducting layer and rendered leaktight by virtue of adhesive in the overlap regions of parts of said strip, or a "leaktight" shield of metal tube type optionally composed of lead or of lead alloy and surrounding the second semiconducting layer. This last type of shield makes it possible in particular to form a barrier to moisture which has a tendency to penetrate radially into the power cable.

The metal shield of the power cable of the invention can comprise a "wire" shield and a "leaktight" shield or a "wire" shield and a "strip" shield.

All the types of metal shields can play the role of earthing the power cable and can thus transmit fault currents, for example in the event of short-circuit in the network concerned.

Other layers, such as layers which swell in the presence of moisture, can be added between the second semiconducting layer and the metal shield, between the metal shield and the electrically insulating sheath, when they exist, these layers making it possible to provide the longitudinal water-tightness of the power cable.

A second subject-matter of the invention is a process for the manufacture of a medium-voltage or high-voltage power cable in accordance with the first subject-matter of the invention and comprising at least one elongated electrical conductor element, a first semiconducting layer which surrounds the elongated electrical conductor element, an electrically insulating layer which surrounds the first semiconducting layer, and a second semiconducting layer which surrounds said electrically insulating layer, and in which said electrically insulating layer is at least one layer of a thermoplastic polymer material comprising a continuous polypropylene matrix obtained by polymerization of Ziegler-Natta type of at least one propylene homopolymer or copolymer, and in which a polyethylene having a density varying from 0.930 to 0.970 g/cm$^3$ is dispersed. This process comprises the stages consisting in:

1) extruding and depositing the first semiconducting layer around the electrical conductor, 2) extruding and depositing the electrically insulating layer around said first semiconducting layer, and 3) extruding and depositing the second semiconducting layer around said electrically insulating layer.

In an alternative form, stages 1) to 3) can be carried out concomitantly.

BRIEF DESCRIPTION OF THE DRAWINGS

Other characteristics and advantages of the present invention will become apparent in the light of the description of a nonlimiting example of an electric cable according to the invention made with reference to FIG. 1, representing a diagrammatic view in perspective and in cross section of an electric cable according to a preferred embodiment in accordance with the invention.

DETAILED DESCRIPTION

Figure 1:
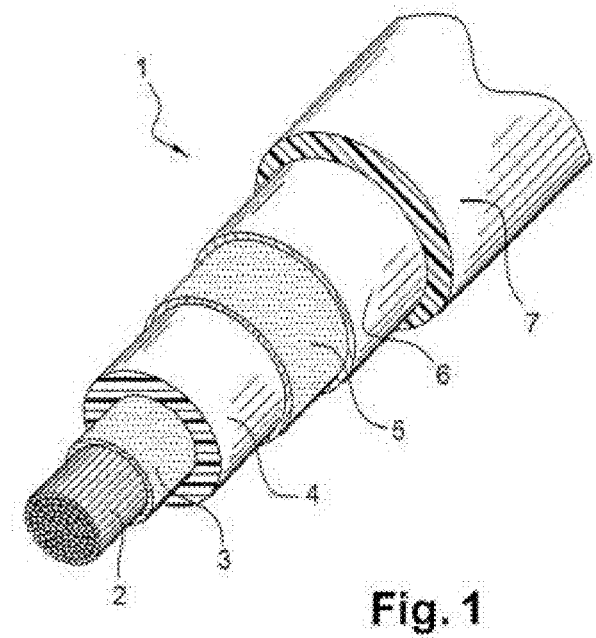

The medium- or high-voltage power cable 1, illustrated in FIG. 1, comprises a central conducting element 2, in particular made of copper or of aluminium, and successively and coaxially comprises, around this element, a first semiconducting layer 3 known as "internal semiconducting layer", an electrically insulating layer 4, a second semiconducting layer 5 known as "external semiconducting layer", a metal shield 6 of the cylindrical tube type and an exterior protective sheath 7, the electrically insulating layer 4 being made of a thermoplastic polymer material comprising a continuous polypropylene matrix obtained by polymerization of Ziegler-Natta type of at least one propylene homopolymer or copolymer, and in which an ethylene homo- or copolymer having a density varying from 0.930 to 0.970 g/cm$^3$ is dispersed.

The layers 3 and 5 are layers extruded by processes well known to a person skilled in the art.

The presence of the metal shield 6 and of the exterior protective sheath 7 is preferable but not essential. This cable structure is as such of known type and outside the scope of the present invention.

EXAMPLES

Example 1: Preparation of a Thermoplastic Polymer Material which can be Used as Electrically Insulating Layer in a Cable in Accordance with the Invention and of a Comparative Material A thermoplastic polymer material in accordance with the invention (TPM 1) and also a comparative thermoplastic polymer material not forming part of the present invention (TPM 2) were prepared, the compositions of which are given in Table 1 below (% by weight):

TABLE 1

| Components | TPM 1 | TPM 2 (*) |
|---|---|---|
| Random propylene copolymer | 47% | 50% |
| Heterophasic propylene copolymer | 9.7% | 25% |
| High-density polyethylene (HDPE) | 20% | — |
| Linear low-density polyethylene | 23% | 24.7% |
| Antioxidant | 0.3% | 0.3% |

(*) comparative TPM not forming part of the invention

The origins of the compounds in Table 1 are as follows:
Random propylene copolymer sold by *Borealis* under the reference Bormed® RB 845 MO;
Heterophasic propylene copolymer sold by Basell Polyolefins under the reference Adflex® Q 200 F;
High-density polyethylene sold under the trade name Eltex® A4009 MFN1325 by Ineos, the density of which is 0.960 g/cm$^3$ according to Standard ISO 1183A (at a temperature of 23° C.);
Linear low-density polyethylene sold under the trade name LDPE LL 1002 YB by ExxonMobil Chemical, the density of which is 0.918 g/cm$^3$ according to Standard ISO 1183A (at a temperature of 23° C.);
Antioxidant sold by Ciba under the reference Irganox® B 225, which comprises an equimolar mixture of Irgafos® 168 and Irganox® 1010.

The different components of the materials TPM 1 and TPM 2 were introduced into a Berstorff twin-screw extruder and extruded at a maximum temperature of 180° C. to 200° C. approximately (the rotational speed of the twin screws of the extruder being adjusted to 80 revolutions per minute), and then the material was melted at 200° C. approximately.

Each of the thermoplastic polymer materials TPM 1 and TPM 2 was thus prepared in the form of layers with a thickness of 1.0 mm and also of layers with a thickness of 8.0 mm in order to carry out the thermal conductivity measurements.

These materials TPM 1 and TPM 2 were subsequently compared from the viewpoint of their mechanical properties (tensile strength/elongation at break before and after ageing), of their density, of their thermal conductivity (at 45° C., 85° C. and 95° C.) and of their electrical properties (dielectric strength).

Mechanical Properties:

The tests of tensile strength and of elongation at break were carried out on the materials in the form of layers with a thickness of 1 mm according to Standard NF EN 60811-1-1, before and after ageing at 135° C. for 240 hours.

The thermal conductivity of the materials was measured on the materials in the form of 8-mm layers using an appliance sold under the reference 3345 by Instron under the conditions given in Standard EN 60811-1-1.

The dielectric strength of the layers was measured using a device comprising two flat electrodes made of stainless steel with a diameter of 20 mm approximately (one electrode under voltage and the other connected to earth) and a dielectric oil sold by Bluestar Silicones under the reference Rhodorsil® 604 V 50. By definition, the dielectric strength is the ratio of the breakdown voltage to the thickness of the insulator. The breakdown voltage was measured at 24° C. approximately, with a humidity of 50% approximately, using the stepped voltage climb method. The applied voltage was an alternating voltage with a frequency of 50 Hz approximately and the voltage climb rate was 1 kV/s approximately up to the point of breakdown. 12 measurements were carried out for each material.

The results corresponding to each of these tests are given in Tables 2 (mechanical properties) and 3 (dielectric strength) below:

TABLE 2

| Properties | TPM 1 | TPM 2 (*) |
|---|---|---|
| Tensile strength (MPa) | 18.5 | 19.2 |
| Elongation at break (%) | 503 | 538 |
| Tensile strength after ageing (MPa) | 19.0 | 19.9 |
| Elongation at break after ageing (%) | 499 | 537 |
| Density (g/cm$^3$) | 0.910 | 0.900 |
| Thermal conductivity at 45° C. (W/mK) | 0.2961 | 0.2670 |
| Thermal conductivity at 85° C. (W/mK) | 0.2925 | 0.2655 |
| Thermal conductivity at 95° C. (W/mK) | 0.3111 | 0.2800 |

(*) comparative TPM not forming part of the invention

TABLE 3

| Material | Dielectric strength (kV/mm) |
|---|---|
| TPM 1 | 110.17 |
| TPM 2 (*) | 129.25 |

(*) comparative TPM not forming part of the invention

These combined results show that the incorporation of a high-density polyethylene in a polypropylene matrix is not harmful to the mechanical properties of the thermoplastic polymer material which can be used in accordance with the invention as electrically insulating layer of a medium- or high-voltage power cable, the latter retaining good mechanical properties in terms of tensile strength and of elongation at break, including after ageing (Table 2). Neither is the incorporation of a high-density polyethylene harmful to the dielectric properties of the insulating layer, which retains a dielectric strength value entirely compatible with the application envisaged (medium-voltage or high-voltage cables) (Table 3). On the other hand, the presence of high-density polyethylene results in a thermoplastic material which has a greater thermal conductivity than that of a thermoplastic polymer material in which the polyethylene is a linear low-density polyethylene (Table 2).

Example 2: Preparation of a Thermoplastic Polymer Material which can be Used as Electrically Insulating Layer in a Cable in Accordance with the Invention and of a Comparative Material Two thermoplastic polymer materials in accordance with the invention (TPM 3 and TPM 4) and also a comparative thermoplastic polymer material not forming part of the present invention (TPM 5) were prepared, the compositions of which are given in Table 4 below (% by weight):

TABLE 4

| Components | TPM 3 | TPM 4 | TPM 5 (*) |
|---|---|---|---|
| Random propylene copolymer | — | — | 56.6% |
| Heterophasic propylene copolymer | 47% | 47% | 9.4% |
| High-density polyethylene (HDPE) | 47% | 47% | — |
| Linear low-density polyethylene | — | — | 24.7% |
| Antioxidant | 0.3% | 0.3% | 0.3% |
| Dielectric liquid | 5.7% | 5.7% | — |

(*) comparative TPM not forming part of the invention

The origins of the compounds in Table 4 are as follows:
Random propylene copolymer sold by *Borealis* under the reference Bormed® RB 845 MO;
Heterophasic propylene copolymer sold by Basell Polyolefins under the reference Adflex® Q 200 F;
High-density polyethylene sold under the trade name Eltex® A4009 MFN1325 by Ineos, the density of which is 0.960 g/cm$^3$ according to Standard ISO 1183A at a temperature of 23° C. (MFI=0.9) (for TPM 3), or under the trade name Eltex® A4020 N1331 by Ineos, the density of which is 0.952 g/cm$^3$ according to Standard ISO 1183A at a temperature of 23° C. (MFI=2.2) (for TPM 4);
Linear low-density polyethylene sold under the trade name BPD 3642 by Ineos, the density of which is 0.92 g/cm$^3$ according to Standard ISO 1183A (at a temperature of 23° C.);
Antioxidant sold by Ciba under the reference Irganox® B 225, which comprises an equimolar mixture of Irgafos® 168 and Irganox® 1010; and
Dielectric liquid sold under the reference Dowtherm RP by Dow.

The different components of the materials TPM 3, TPM 4 and TPM 5 were introduced into a Berstorff twin-screw extruder and extruded at a maximum temperature of 180° C. to 200° C. approximately (the rotational speed of the twin screws of the extruder being adjusted to 80 revolutions per minute), and then the material was melted at 200° C. approximately.

Each of the thermoplastic polymer materials TPM 3, TPM 4 and TPM 5 was thus prepared in the form of layers with a thickness of 1.0 mm and also of layers with a thickness of 8.0 mm in order to carry out the thermal conductivity measurements.

These materials TPM 3, TPM 4 and TPM 5 were subsequently compared from the viewpoint of their mechanical properties (tensile strength/elongation at break before and after ageing), of their density and of their thermal conductivity.

Mechanical Properties:

The tests of tensile strength and of elongation at break were carried out on the materials in the form of layers with a thickness of 1 mm according to Standard NF EN 60811-1-1, before and after ageing at 135° C. for 240 hours.

The thermal conductivity of the materials was measured on the materials in the form of 8-mm layers using an appliance sold under the reference 3345 by Instron under the conditions given in Standard EN 60811-1-1.

The results corresponding to each of these tests are given in Table 5 (mechanical properties) below:

TABLE 5

| Properties | TPM 3 | TPM 4 | TPM 5 (*) |
|---|---|---|---|
| Tensile strength (MPa) | 15.1 | 14.3 | 19.1 |
| Elongation at break (%) | 754 | 813 | 679 |
| Tensile strength after ageing (MPa) | 13.2 | 12 | 17.6 |
| Elongation at break after ageing (%) | 543 | 576 | 492 |
| Density (g/cm$^3$) | 0.900 | 0.898 | 0.904 |

(*) comparative TPM not forming part of the invention

These combined results show that the incorporation of a high-density polyethylene in a polypropylene matrix is not harmful to the mechanical properties of the thermoplastic polymer material which can be used in accordance with the invention as electrically insulating layer of a medium- or high-voltage power cable, the latter retaining very good mechanical properties (indeed even better mechanical properties) in terms of tensile strength and of elongation at break, including after ageing (Table 5).

Figure 2:
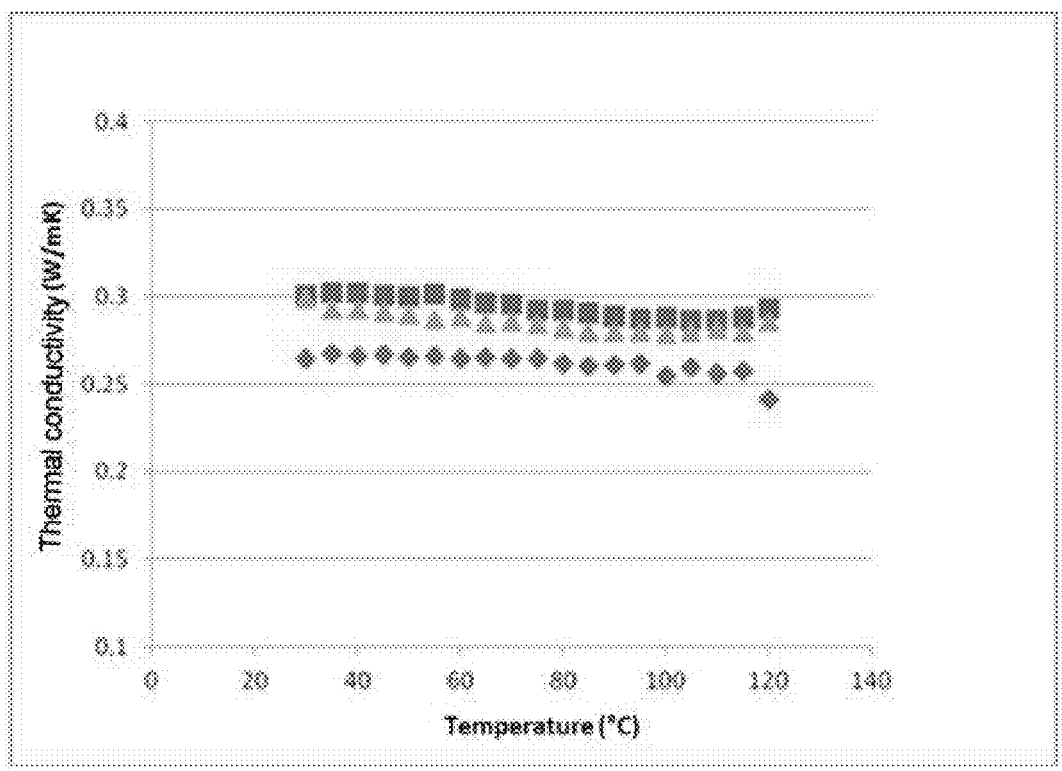
FIG. 2 is a conductivity graph of the thermoplastic polymer materials—TPM 3 (curve with the solid squares), TPM 4 (curve with the solid triangles) and TPM 5 (curve with the solid diamonds).

The thermal conductivity results of TPM 3 (curve with the solid squares), TPM 4 (curve with the solid triangles) and TPM 5 (curve with the solid diamonds) are given in FIG. 2. The presence of high-density polyethylene results in a thermoplastic material which has a greater thermal conductivity than that of a thermoplastic polymer material in which the polyethylene is a linear low-density polyethylene.

The invention claimed is:

1. Medium-voltage or high-voltage power cable comprising:
   at least one elongated electrical conductor element, a first semiconducting layer which surrounds the elongated electrical conductor element, an electrically insulating layer which surrounds the first semiconducting layer, and a second semiconducting layer which surrounds said electrically insulating layer, wherein the electrically insulating layer is at least one layer of a composite thermoplastic polymer material comprising a continuous polypropylene matrix obtained by polymerization of Ziegler-Natta type of at least one propylene homopolymer or copolymer, and in which a polyethylene chosen from an ethylene homo- or copolymer having a density varying from 0.930 to 0.970 g/cm$^3$ is dispersed in the form of fine particles,
   wherein the polyethylene represents from 10% to 50% by weight, with respect to the total weight of the composite thermoplastic polymer material.

2. Cable according to claim 1, wherein the propylene copolymer is a random propylene copolymer.

3. Cable according to claim 1, wherein the propylene copolymer is chosen from copolymers of propylene and of olefin, the olefin being chosen from ethylene and an α-olefin other than propylene.

4. Cable according to claim 1, wherein the propylene copolymer is a copolymer of propylene and of ethylene.

5. Cable according to claim 1, wherein the propylene copolymer is a heterophasic copolymer comprising a thermoplastic phase of propylene type and an elastomer phase of the type of copolymer of ethylene and of an α-olefin.

6. Cable according to claim 1, wherein the propylene homopolymer or copolymer represents from 40% to 70% by weight, with respect to the total weight of the composite thermoplastic polymer material.

7. Cable according to claim 1, wherein the ethylene homo- or copolymers have a density varying from 0.940 to 0.965 g/cm$^3$.

8. Cable according to claim 1, wherein the polyethylene is an ethylene homopolymer.

9. Cable according to claim 1, wherein the polyethylene is a nonpolar ethylene copolymer which can comprise a comonomer of α-olefin type.

10. Cable according to claim 1, wherein the thermoplastic polymer material additionally comprises at least one dielectric liquid.

11. Medium-voltage or high-voltage power cable comprising:
at least one elongated electrical conductor element, a first semiconducting layer which surrounds the elongated electrical conductor element, an electrically insulating layer which surrounds the first semiconducting layer, and a second semiconducting layer which surrounds said electrically insulating layer, wherein the electrically insulating layer is at least one layer of a composite thermoplastic polymer material comprising a continuous polypropylene matrix obtained by polymerization of Ziegler-Natta type of at least one propylene homopolymer or copolymer, and in which a polyethylene chosen from an ethylene homo- or copolymer having a density varying from 0.930 to 0.970 g/cm$^3$ is dispersed in the form of fine particles,
wherein the composite thermoplastic polymer material additionally includes at least one α-olefin homopolymer or copolymer, and
wherein the α-olefin homopolymer or copolymer and/or the polyethylene represent, independently of one another, from 5% to 50% by weight of the composite thermoplastic polymer material.

12. Medium-voltage or high-voltage power cable comprising:
at least one elongated electrical conductor element, a first semiconducting layer which surrounds the elongated electrical conductor element, an electrically insulating layer which surrounds the first semiconducting layer, and a second semiconducting layer which surrounds said electrically insulating layer, wherein the electrically insulating layer is at least one layer of a composite thermoplastic polymer material comprising a continuous polypropylene matrix obtained by polymerization of Ziegler-Natta type of at least one propylene homopolymer or copolymer, and in which a polyethylene chosen from an ethylene homo- or copolymer having a density varying from 0.930 to 0.970 g/cm$^3$ is dispersed in the form of fine particles,
wherein the composite thermoplastic polymer material additionally includes a heterophasic copolymer comprising a thermoplastic phase of propylene type and an elastomer phase of the type of copolymer of ethylene and of an α-olefin, a polyethylene or one of their mixtures, and
wherein the α-olefin homopolymer or copolymer and/or the heterophasic copolymer and/or the polyethylene represent, independently of one another, from 5% to 50% by weight of the composite thermoplastic polymer material.

* * * * *